May 17, 1932.   F. BLAKE   1,858,477
BICYCLE AND MOTORCYCLE SEAT
Filed Jan. 26, 1931
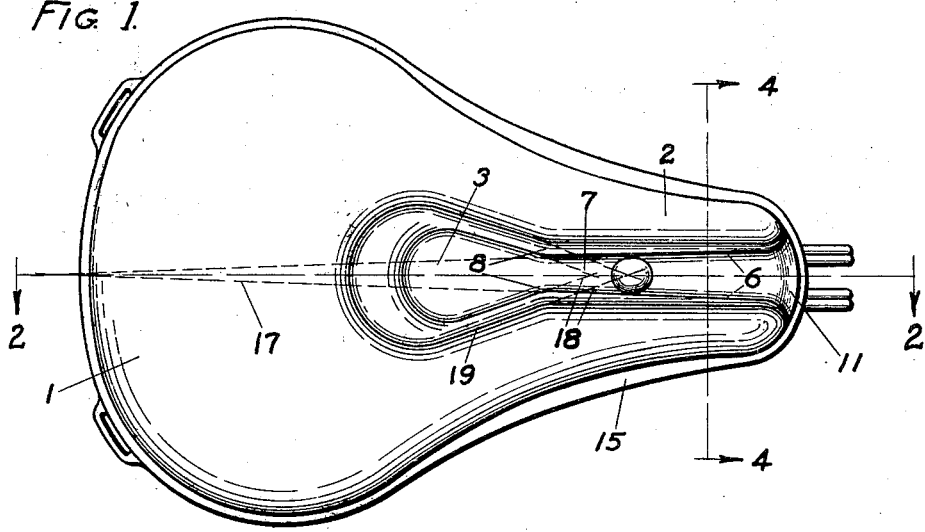
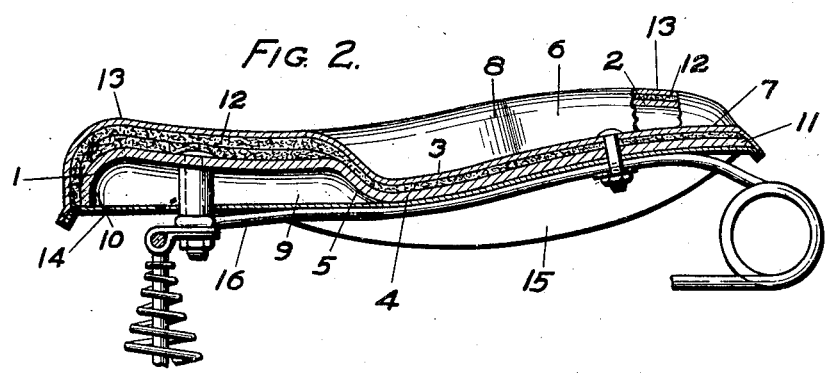
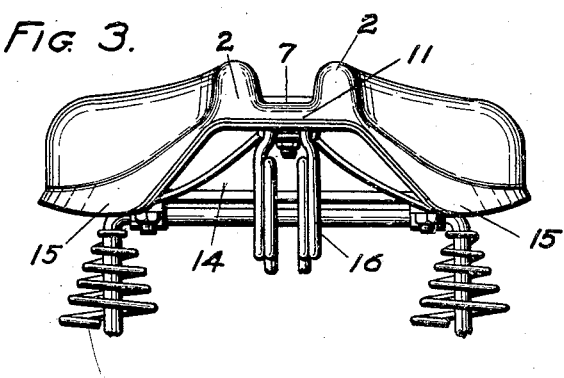
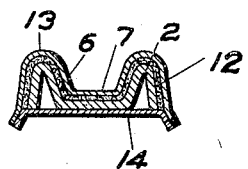
Inventor
FRED BLAKE
By Owen H. Spencer
Attorney Patented May 17, 1932

1,858,477

UNITED STATES PATENT OFFICE

FRED BLAKE, OF INDIANAPOLIS, INDIANA

BICYCLE AND MOTORCYCLE SEAT

Application filed January 26, 1931. Serial No. 511,132.

This invention relates to bicycle and motorcycle seats and is primarily an improvement over my former Patent No. 1,538,542, issued May 19, 1925.

In this invention, comprising a seat for bicycles and motorcycles, the improvement consists in so shaping and constructing the parts of the saddle that cavities will be formed for receiving the genital organs of the rider, whether male or female and such organs be protected while riding or when mounting or dismounting therefrom and while shifting the body forwardly or rearwardly on the saddle, the parts of the saddle being substantially body fitting at whatever point on the saddle the rider may be sitting.

It is a further feature of the invention to provide a suitable frame for the saddle and a plate mechanism for holding the parts of the saddle in position on the frame, so that even though the weight of the body will depress certain parts of the saddle, a smooth continuous curvature of the surface will be maintained throughout the extent of the saddle.

Other objects and advantages will be hereinafter more fully set forth and pointed out in the accompanying specification.

In the accompanying drawings which are made a part of this application,

Figure 1 is a top plan view of the saddle.

Figure 2 is a sectional view thereof as seen along line 2—2, Fig. 1.

Figure 3 is a front elevation of the seat structure, and

Figure 4 is a sectional view as seen along line 4—4, Fig. 1.

Referring to the drawings, the numeral 1 designates the main seat portion of the saddle, being the rearward portion thereof, and 2 designates a pair of extensions which are dual in character and arranged to form a somewhat divided horn for the saddle. Said seat and horn resemble a substantially conventionally shaped seat in respect to the plan formation of the outer structure.

At the point of juncture between the seat forming portion 1 and horn forming extensions 2, is formed a cavity 3 adapted to receive the genital organs of a male rider, the bottom and side walls 4 and 5, of the cavity 3, gradually curving and merging into each other and into the remainder of the seat structure, so that there will be no abrupt projections or straight walls to come in contact with or injure the genital organs of the rider. The extensions 2 are likewise so shaped that there will be no abrupt or straight walls or projecting parts for injurious contact with the genital organs of either a male or female rider, the inner side walls 6 gradually increasing in distance apart toward the outer ends of the extensions.

With this form of device, the genital organs will readily slide from one part of the saddle to another, as when the rider shifts the body forward for bringing the weight of the body in position to acquire more powerful pedaling, the forward shifting of the body bringing the weight directly over the pedals. This forward shifting movement, in many instances, is carried out by a somewhat horizontal sliding movement of the body on the saddle, the rider not caring to raise himself vertically in connection with such forward movement, except to reduce the frictional pressure of the body against the seating surface of the seat, consequently the genital organs, especially the testicle portions thereof, will readily move out of the cavity 3 and into the space 7 between the extensions 2 and, due to the curved faces 8, at the juncture of the wall of the cavity 3 with the inner face walls of the extensions 2, no pinching or squeezing action will be imparted to the genital organs while passing out of or returning into the cavity 3.

The extensions 2 are substantially in the shape of an inverted V in cross section so that the genital organs of either a male or female rider may pass therebetween without injury to such parts and, due to the outlines of said extensions, they will snugly fit in the crotch between the genital organs and the legs without setting up friction or irritation.

It will likewise be seen that the formation of the extensions 2 will tend to close and maintain the genital organs of a female in closed position, thus guarding against the possibility of spreading or opening the genital organ of the female and thus exposing the sensitive portions thereof, or in setting up constant friction on such genital organs to such an extent as to cause artificial sexual excitement.

The seat forming portion of the device is preferably formed of a metal plate, having its side and rear edges 9 and 10 respectively curved downwardly from the seat portion proper and the forward end of the horn forming portion 11, as well as the forward ends of the extensions 2 are rounded to prevent any abrupt projections.

Extending over the top face of the seat forming plate proper and over the extensions 2, is any suitable cushioning means 12, over which is extended a covering 13 of leather or other suitable material, a covering 14, of a like material being extended beneath the seat and the edges of said coverings are secured together in any suitable manner, as by stitching or otherwise, thus completely enclosing the seat forming plate. If desired, the edges of the coverings 13 and 14 may be extended to form flaps or guards 15.

In the present instance, the seat is shown as attached to the conventional spring mounting 16 for bicycles, although it will be understood that any suitable mounting for a bicycle or motorcycle may be employed.

The space 7 forms a channel, the main side walls 6 thereof being somewhat closer together at their rearward portion in the region of the curved faces 8, than at their forward end. Dotted lines 17 indicate that the trend of said walls 6 is toward intersection rearwardly, and likewise, the dotted lines 18 indicate that walls 19 which form the forward portion of cavity 3 trend toward intersection forwardly.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. A bicycle and motorcycle seat having a cavity suitably located to normally receive and partly contain the private organs of male riders, the rearward portion of said cavity having a substantially circular plan formation, the circular plan of which extends forwardly beyond its own center, the forward portion of said cavity being completed by walls tangent to said circular formation, the lines of said walls trending toward intersection in the forward portion of said saddle, and a channel, the walls of which merge with the forward ends of the first mentioned walls, said channels serving to partly receive the private organs of female riders and to partly contain the private organs of male riders under certain conditions, and a floor, the surface of which merges with the surfaces of said cavity and channel.

2. A bicycle and motorcycle seat having a cavity suitably located to normally receive and partly contain the private organs of male riders, the rearward portion of said cavity having a substantially circular plan formation, the circular plan of which extends forwardly beyond its own center, the forward portion of said cavity being completed by walls tangent to said circular formation, the lines of said walls trending toward intersection in the forward portion of said saddle, and a channel, the walls of which merge with the forward ends of the first mentioned walls, the lines of the walls of said channel trending toward conversion rearwardly, said channel serving to partly receive the private organs of female riders and to partly contain the private organs of male riders under certain conditions, and a floor structure for said cavity and channel which curves into the walls of same.

3. A bicycle and motorcycle seat, having a channel in the face thereof which begins at a suitable point to support and partly contain the private organs of male riders, said channel becoming more narrow forwardly to a point for forming a more restricted lodging for such organs, and extending thence gradually wider to the forward extremity to more amply clear the sensitive points of female riders; whereby the structure is adapted to receive and protect organs of both male and female riders and at the same time permit shifting of either along said channel as sometimes required in riding, without abrupt obstruction.

4. A bicycle and motorcycle seat, having a channel in the face thereof which begins at a suitable point to support and partly contain the private organs of male riders, said channel becoming more narrow forwardly to a point for forming a more restricted lodging for such organs, and extending thence gradually wider to the forward extremity to more amply clear the sensitive points of female riders, and a floor thruout the length of said channel; whereby the structure is adapted to receive and protect organs of both male and female riders and at the same time permit shifting of either along said channel as sometimes required in riding, without abrupt obstruction.

In testimony whereof, I have hereunto set my hand on this the 19th day of December, 1930.

FRED BLAKE.